United States Patent Office 3,185,503
Patented May 25, 1965

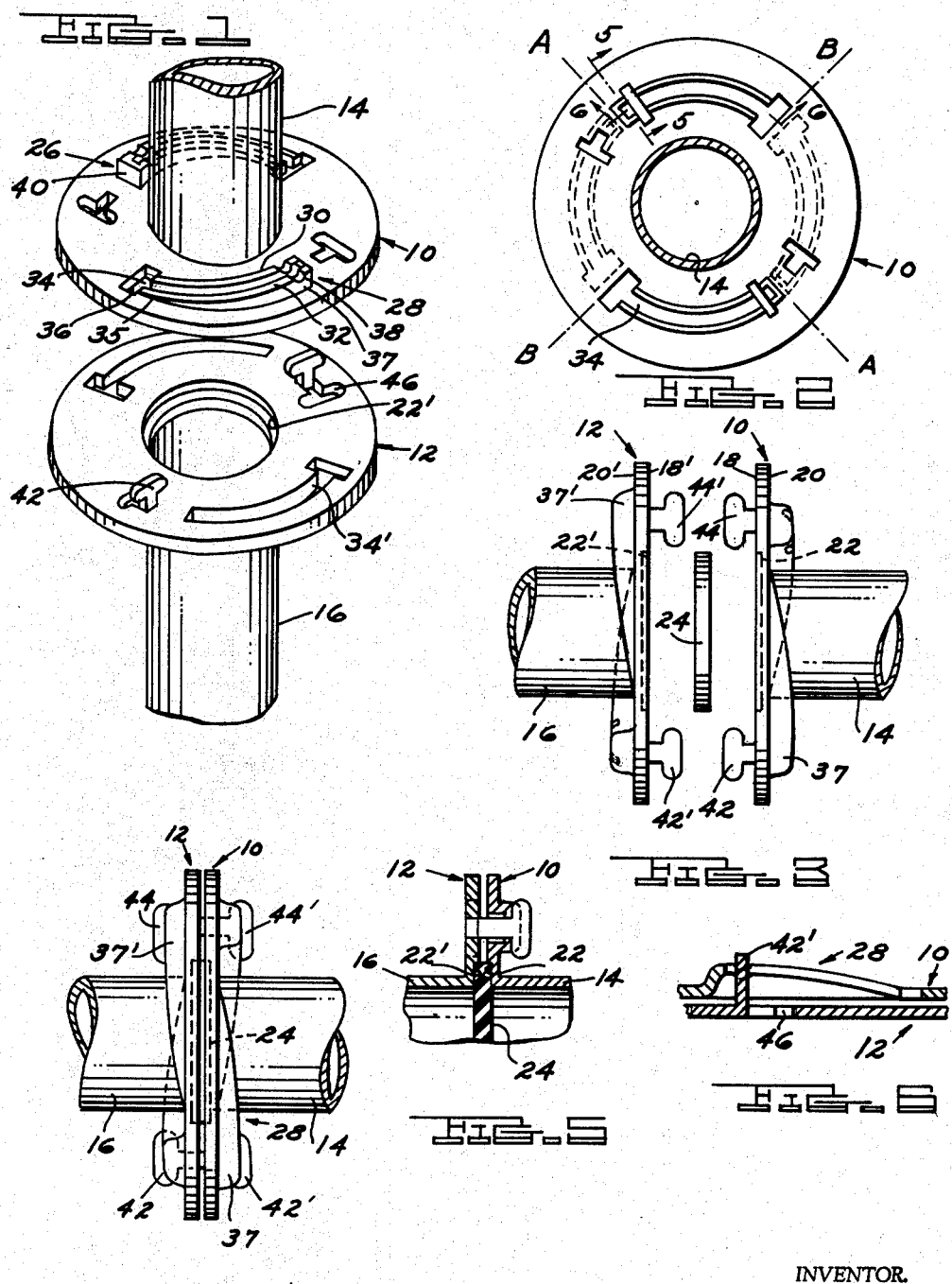

3,185,503
UNIVERSAL HOSE COUPLER
Kenneth J. Angle, Mount Clemens, Mich.
(3482 Chestnut Drive, Doraville, Ga.)
Filed Oct. 25, 1962, Ser. No. 233,053
1 Claim. (Cl. 285—74)

The present invention relates to coupling devices and refers more specifically to a self-sealing hose coupling having identical coupling elements.

The hose or conduit couplings in the prior art having usually been of the mating type wherein two dissimilar coupling elements, usually one male element and one female element, were required to complete a hose or conduit connection. Such hose elements have in the past been the cause of much inconvenience and wasted time in making hose connections, since adjacent coupling elements must be selected with the coupling element to which they are to be connected in mind.

Further, prior hose couplings have often been constructed so that under high pressure the couplings tend to leak so that special attention must be given the coupling elements when high pressures are employed or special coupling elements must be provided for high pressure use.

It is, therefore, one of the objects of the present invention to provide a coupling so constructed that two identical elements may be secured together to couple adjacent hose ends.

Another object of the present invention is to provide a coupling which can be conveniently and rapidly connected and disconnected.

Still another object of the present invention is to provide a conduit coupling comprising a pair of coupling elements of circular cross-section which are arranged on opposite ends of a pair of conduit sections, with each element being provided with a pair of circumferentially extending closely spaced integral cam tracks of progressively increasing depth on the outer sides thereof, and a tab forming a cam provided on each of the elements for the pair of tracks in the other element and which is adapted to be moved through the space between the tracks provided on the other element upon relative rotation between the elements so as to lock the elements together in coupling relationship.

A further object of the present invention is to provide a conduit coupling of the aforementioned type wherein a washer is interposed between the inner faces of the elements and placed under compression upon the coupling of the elements to prevent leakage of fluid between the inner faces of the elements.

A still further object of the present invention is to provide a conduit coupling of the aforementioned type wherein oppositely facing annular recesses are provided in the inner faces of the elements to define a chamber for the reception of a washer, said washer being placed under compression upon the coupling of the elements to prevent fluid leakage between the inner faces of the elements.

Another object of the present invention is to provide a conduit coupling of the aforementioned type which is simple in construction, economical to manufacture, and efficient in operation.

Other objects and features of the invention will become apparent as the description proceeds, especially when taken in conjunction with the accompanying drawing, illustrating a preferred embodiment of the invention, wherein:

FIGURE 1 is a perspective view of the invention with the conduit sections illustrated in an uncoupled position.

FIGURE 2 is a plan view of the conduit coupling illustrating the coupling elements in a coupled position.

FIGURE 3 is a vertical elevational view illustrating the device in an uncoupled position.

FIGURE 4 is a vertical elevational view illustrating the device in a coupled position.

FIGURE 5 is a fragmentary sectional view taken on line 5—5 of FIGURE 2.

FIGURE 6 is a fragmentary sectional view taken on line 6—6 of FIGURE 2.

Referring now to FIGURE 1, a pair of identical annular coupling elements or disks 10 and 12 constructed in accordance with the invention are adapted to be connected together to provide a coupling between the adjacent ends of a pair of hose sections, conduits, tubular elements, or the like which are represented by the numerals 14 and 16. The invention is specifically adapted to be used with various tubular sections forming a garden hose. In such an example the hose sections are usually made from a rubber or plastic material. In addition, it should be understood that the invention may be used with other types of conduits which are made, as an example, from various metals and which are adapted for industrial applications where relatively large fluid pressures are involved such as between a fluid pump and a reservoir.

The annular coupling elements or disks 10 and 12 are of circular configuration and of identical shape and design. The annular coupling elements 10 and 12 are connected to the hose sections or conduits 14 and 16 respectively by suitable means well known in the art. As an example, the elements 10 and 12 may be pressure-fitted to the conduits or mechanical interlocking means may be utilized.

The coupling elements 10 and 12 are made from metal stampings and are formed by a suitable metal forming apparatus. As an example, for a garden hose, the coupling elements 10 and 12 have an outside diameter of 2″, an inside diameter of ⅞″, and a thickness of approximately ⅛″.

Since the annular coupling elements 10 and 12 are identical, the same numerical designations will be utilized for both in describing components thereof with the exceptions that the numbers referring to element 12 will be primed.

The annular coupling element 10 is provided with an inner face or side 18 and an outer face or side 20. The inner face 18 is provided with an annular recess 21 which forms with recess 21′ a cavity for the annular washer or seal 24.

The annular coupling element 10 is provided with two pairs of circumferentially extending integral track means which are designated by the numerals 26 and 28. Each of the track means includes a pair of integral circumferentially extending closely spaced tracks 30 and 32 of progressively increasing depth which are struck out of the element 10 and turned outwardly from the outer side 20 and arranged substantially perpendicular thereto.

The tracks 30 and 32 are spaced uniformly apart and the space is designated by the numeral 34. A radially extending slot 36 is provided at the lowest end 35 of tracks 30 and 32 and is in communication with the space 34. The highest end 37 of the tracks 30 and 32 is provided with radially extending groove means 38 which is used for a purpose to be hereinafter described.

The highest end 37 of the tracks 30 and 32 is connected by a radially extending wall 40. The walls 40 in the track means 26 and 28 lie in a radially extending plane A—A illustrated in FIGURE 2. The outer edges of the slots 36 also lie in a radially extending plane B—B illustrated in FIGURE 2. Plane B—B is substantially perpendicular to plane A—A and therefore each track means and corresponding slot 36 has a circumferential extent of 90°.

Spaced a predetermined distance from the smallest end 35 of each of the pairs of tracks 30 and 32 is a tab 42 which is struck out of the element 10 and bent outwardly from the inner side 18 and arranged substantially perpendicular thereto. The tab 42 forms a cam and includes a pair of radially extending arms 44. The space remaining in the element 10 after the tab 42 is formed is designated by the numeral 46.

In the illustrated embodiment each of the coupling elements is provided with a pair of circumferentially extending track means, each having an angular extent of approximately 90°. A pair of tabs are provided on each element, one tab between the adjacent ends of the pair of track means.

It should be understood that any number of track means and tabs may be provided on each element, the essential feature being that each element has a like number of track means and tabs.

In the present embodiment the two tabs 42 or 42' on elements 10 and 12 respectively are adapted to be inserted in the space between the corresponding pair of tracks of the other element. One tab 42 on element 10 is for track means 26' on element 12 while the other tab 42 is for track means 28' on element 12. The reverse is true for element 12 wherein one tab 42' is for track means 26 on element 10 while the other tab 42' is for track means 28 on element 10.

When it is required to couple the elements together, the two tabs on each element are inserted through the corresponding slots 36 or 36' in the other element as the case may be such that the arms of the tabs are located opposite the lowest end of the opposite pair of tracks. Relative rotation is then provided between the elements 10 and 12 such that the tabs are moved through the space between the opposite tracks, with the arms of each tab riding along the upper surfaces of the tracks 30 and 32 or 30' and 32' as the case may be so as to pull or cam the inner faces 18 and 18' of the elements 10 and 12 respectively together. After the relative rotation has been completed, the arms of each tab engage the grooves means 38 or 38' as the case may be so as to couple the elements together in interlocking relationship.

Prior to coupling the elements together, the washer 24 is placed in recess 21. Upon relative rotation the washer or seal 24 is compressed as best illustrated in FIGURE 5 so as to positively prevent fluid leakage at the inner faces of the elements. When the elements 10 and 12 are in a coupled position, the device assumes the position illustrated in FIGURE 4.

The drawing and the foregoing specification constitute a description of the improved universal hose coupler in such full, clear, concise, and exact terms as to enable any person skilled in the art to practice the invention, the scope of which is indicated by the appended claim.

What I claim as my invention is:

A conduit coupling comprising a pair of substantially identical generally flat relatively thin coupling disks which are arranged on opposite ends of a pair of conduit sections, each of said disks having the same uniform thickness, said disks each being symmetrically constructed and having inner and outer surfaces which are parallel, with said inner surfaces facing one another, two pairs of circumferentially extending closely spaced integral cam tracks struck out of each of said disks and turned outwardly from the outer surface thereof and arranged substantially perpendicular thereto, each track being of uniform thickness, the tracks of each pair being spaced radially and substantially uniformly apart to define an elongated circumferentially extending opening which extends entirely through both surfaces of the disk, said two pairs of tracks on each disk each having a circumferential extent of approximately 90°, each pair of cam tracks progressively increasing in depth from one end to the other end thereof, transversely extending wall means connecting each pair of cam tracks adjacent said other end thereof, said one end of each pair of cam tracks terminating adjacent a radially extending elongated slot which intersects the elongated opening between the last-mentioned tracks, said slot extending through both surfaces of the disk, radially extending relatively shallow groove means formed in the top surface of each pair of cam tracks adjacent said wall means, and two radially extending tabs each of substantially T-shaped configuration and uniform thickness struck out of each of said disks for cooperation with the two pairs of cam tracks in the other disk and leaving corresponding T-shaped openings in the disk to which the tabs are connected, said tabs each including an arm connected on the inner end thereof to the disk and arranged substantially perpendicular thereto and a radially extending head provided on the outer end of said arm forming on the ends thereof a pair of cam portions, said head being arranged substantially parallel to the disk to which the tab is connected and having a length greater than the width of the corresponding elongated opening provided in the other disk and slightly less than the length of the corresponding slot in the other disk, each of the tabs on each disk being circumferentially spaced from the other end of the adjacent cam tracks on the same disk and insertable through the corresponding slot provided in the other disk and moved circumferentially upon relative rotation of said disks through the corresponding elongated opening to a latched position, with the cam portions thereon in contact with the top surface of the corresponding cam tracks of the other disk until said cam portions are seated in latching position in the corresponding groove means, oppositely facing annular recesses in the inner surfaces of said disks defining an annular chamber for the reception of a washer, said washer being placed under compression upon the coupling of said disks to prevent leakage of fluid between the inner surfaces of said disks.

References Cited by the Examiner

UNITED STATES PATENTS

| | | | |
|---|---|---|---|
| 462,894 | 11/91 | Dinsmore | 285—347 |
| 622,313 | 4/99 | Woodvine | 285—396 X |
| 861,300 | 7/07 | Mack | 285—73 |
| 1,148,824 | 8/15 | Boje | 285—362 |
| 1,738,996 | 12/29 | Hamilton | 285—73 X |
| 2,160,354 | 5/38 | Evans | 285—73 |

FOREIGN PATENTS

| | | |
|---|---|---|
| 1,203,358 | 7/59 | France. |
| 60,626 | 1/92 | Germany. |

CARL W. TOMLIN, *Primary Examiner.*